United States Patent [19]
Poss et al.

[11] Patent Number: 4,478,915
[45] Date of Patent: Oct. 23, 1984

[54] CORROSION RESISTANT SHIM FOR ELECTRICALLY JOINING INCOMPATIBLE MATERIALS

[75] Inventors: Eliasz Poss, Guilford; Marvin Felsen, Fairfield, both of Conn.

[73] Assignee: United Technologies Corporation, Hartford, Conn.

[21] Appl. No.: 549,388

[22] Filed: Nov. 7, 1983

[51] Int. Cl.³ .............................................. F16B 11/00
[52] U.S. Cl. .................................. 428/607; 428/651; 428/626; 403/179; 403/404
[58] Field of Search ............... 428/596, 651, 624, 625, 428/626, 607; 403/179, 404; 228/175, 189

[56] References Cited

U.S. PATENT DOCUMENTS

| 3,052,331 | 9/1962 | Bothwell | 403/404 |
| 3,337,711 | 8/1967 | Garscia | 228/175 |
| 3,613,220 | 10/1971 | Finnegan | 228/189 |
| 4,209,889 | 7/1980 | Silva et al. | 403/404 |

FOREIGN PATENT DOCUMENTS 149780 11/1981 Japan .................................. 428/651

Primary Examiner—L. Dewayne Rutledge
Assistant Examiner—John J. Zimmerman
Attorney, Agent, or Firm—Gerald E. Linden

[57] ABSTRACT

Galvanically incompatible materials are isolated from each other to prevent galvanic corrosion while providing for electrical conductivity therebetween. A two-sided shim is interposed between the galvanically incompatible materials and each side of the shim is galvanically compatible and placed in contact with one of the galvanically incompatible materials. The shim itself is sealed against moisture to prevent galvanic corrosion in a central contact area between the two sides. Holes through the shim to permit the insertion of fasteners therethrough must similarly be sealed.

5 Claims, 2 Drawing Figures

CORROSION RESISTANT SHIM FOR ELECTRICALLY JOINING INCOMPATIBLE MATERIALS

DESCRIPTION

1. Technical Field

This invention relates to joining galvanically incompatible materials and, more particularly, to providing electrical conductivity between the materials without the concomitant corrosion therebetween.

2. Background Art

There is an ever-increasing use of composite materials on modern aircraft. Graphite epoxy is an example of a composite material that provides light-weight, strength, durabliity and the electrical conductivity required for dissipating lightning and for shielding against EMI which results from static electricity. In the usual case where there are also metal airframe parts, such as aluminum, it is necessary to join the composite materials to the metal parts so that there is electrical conductivity therebetween. However, the joining together of dissimilar conductive materials, both of which may be metals, creates a high potential for galvanic corrosion which occurs as a result of the intrusion of moisture into the joint. This problem is especially severe in the case of sea water and rapid deterioration of airframe components, on the order of fifty hours, has been observed. Known techniques for preventing corrosion seal out the moisture. However, there is no reliable and durable way of applying and maintaining a moisture seal around the airframe composite skin joints; both, because the aircraft vibrational environment precludes reliable moisture seals, and also, because there is moisture inside the composite materials that cannot be sealed out. In addition, some of the joints may not be accessible for inspection when they are sealed against the intrusion of moisture.

DISCLOSURE OF THE INVENTION

Therefore, it is an object of this invention to provide for electrical conductivity between galvanically incompatible materials without the concomitant corrosion therebetween.

It is another object of this invention to provide for inspectability of joints.

Accordingly, the corrosion-resistant shim of this invention comprises two thin, flat strips (sides) juxtaposed in touching electrical contact with each other and sealed around their periphery to prevent moisture from intruding into the contact area therebetween. The corrosion-resistant shim is interposed between two materials, such as aluminum and graphite, having dissimilar galvanic potentials. The galvanic potential of one side of the shim is compatible with the aluminum (e.g.) and the galvanic potential of the other side of the shim is compatible with the graphite (e.g.). Therefore, no corrosion occurs between the shim and the two materials. As a consequence of the sides of the shim each being galvanically compatible with the dissimilar materials, the sides are galvanically incompatible with each other. However, since their contact area is sealed against moisture, the shim itself does not corrode. In an embodiment of this invention, a hole through the shim allows for the insertion of a fastener. Therefore, the edges of the hole are similarly sealed against moisture. The foregoing and other objects, features and advantages of the present invention will become more apparent in the light of the following detailed description of an exemplary embodiment thereof.

BEST MODE FOR CARRYING OUT THE INVENTION

Figure 1:
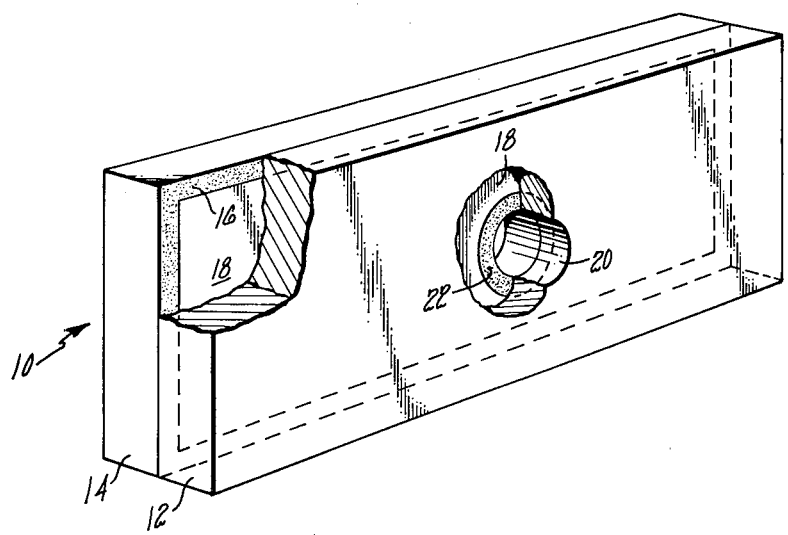
FIG. 1 is an isometric, sectional view of the corrosion-resistant shim of this invention.

FIG. 1 shows a corrosion-resistant shim 10 having two sides 12 and 14. Each side is a long thin strip or foil (dimensions exaggerated) and is juxtaposed with the other side so that the outer peripheries of the two sides 12 and 14 are in direct contact with each other and the edges are in direct contact with each other and the edges thereof are bonded with a thin layer of non-conductive sealant/adhesive 16 which excludes moisture from the central contact area 18. The sealant 16 may be applied as a bead around the periphery (e.g., just inside the edge) of one of the sides before the sides are joined together. The two sides 12 and 14 are dissimilar materials having dissimilar galvanic potentials. When materials having different galvanic potentials are brought into contact with each other in the presence of moisture, a low level electric current flows from the higher potential material to the lower potential one. This configuration may be thought of as a battery with the moisture acting as the electrolyte and the high and low potential metals as the anode and cathode. However, in the case of the corrosion-resistant shim 10, moisture is sealed out of the contact area 18. Therefore, the contact area 18 remains corrosion free so long as the sealant 16 prevents the intrusion of moisture into the contact area 18.

A hole 20 may be provided through the shim 10 to allow for the insertion of a fastener (not shown). In the case of a shim that is pre-drilled, the edges of the hole 20 should have a sealant 22 applied thereto to prevent the intrusion of moisture into the contact area 18. In the case of a shim that is drilled immediately prior to the insertion of a fastener therethrough, the sealant 22 may be applied in conjunction with the insertion of the fastener as is common in aircraft assembly procedure.

Figure 2:
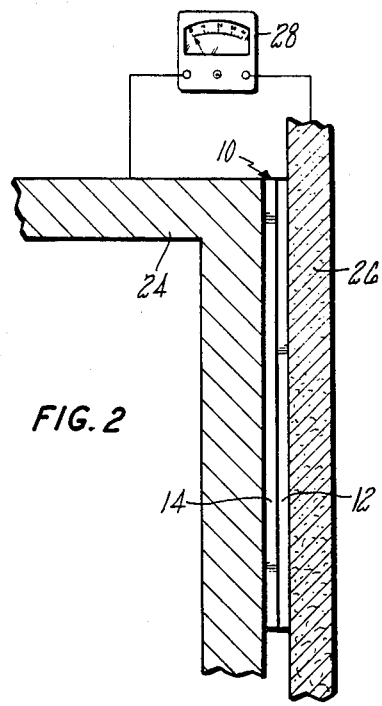
FIG. 2 is a view of the shim of this invention inserted between two non-compatible materials.

In FIG. 2 the shim 10 is shown interposed between two dissimilar materials such as an aluminum strut 24 and a graphite skin 26 of an aircraft. Aluminum has a high galvanic potential and graphite has a low galvanic potential. A joint wherein the two materials are touching is highly suseptible to corrosion. Therefore, the shim 10 provides a buffer therebetween in the following manner. The material for the side 14 is chosen from the Table 1 (following) to have a galvanic potential that is compatible (close in potential) with that of the aluminum strut 24. Therefore, corrosion between the side 14 and the strut 24 is minimized. In fact, the material for the side 14 can be chosen of the same material as the strut 24, thereby insuring an absolute minimum of corrosion so long as the material is capable of being formed into and handled as a long thin strip or foil. Similarly, the material for the side 12 is chosen from the Table 1 to be galvanically compatible with that of the graphite skin 26. Graphite epoxy would not be a preferred choice because of its moisture content. However, titanium is close in potential to graphite and has the added advantage of having similar physical properties as aluminum and being widely used in aircraft manufacture.

Both aluminum and titanium may be formed into foils which are on the order of 0.010 inch in thickness each. Touching electrical contact in the contact area 18 is enhanced by the compressive force of a fastener (not shown).

By using the shim 10 of this invention, electrical conductivity is maintained between the aluminum strut 24 and the graphite skin 26. This is illustrated by an ohmmeter 28 registering ZERO ohms. While moisture can intrude into the joint between the side 14 and the aluminum strut 24, they are galvanically compatible and no corrosion occurs therebetween. Similarly, while moisture can intrude into the joint between the side 12 and the graphite skin 26, they are galvanically compatible and no corrosion occurs therebetween. As stated hereinbefore, the shim itself does not corrode because it is sealed against moisture by the sealant 16. Therefore, a corrosion free joint is achieved between the aluminum strut 24 and the graphite skin 26 without any concomitant corrosion therebetween by interposing the shim of this invention between the aluminum strut 24 and the graphite skin 26. Inspection of the joint, if desired, is achieved simply by disassembly.

If a particular application renders it impossible to completely exclude moisture from the contact area 18, the shim 10 may corrode. In such a case the shim 10 may be considered sacrificial and would be replaced at service intervals.

According to Table 1, metals and alloys are listed in a galvanic series from high potential to low potential and are grouped (solid lines) according to compatibility. The farther apart the metals stand in the galvanic series, the greater is the galvanic action and concomitant corrosion therebetween.

TABLE 1

| Galvanic Series Of Metals and Alloys |
| --- |
| +High potential |
| Magnesium |
| Magnesium alloys |
| Zinc |
| Aluminum 1100 |
| Cadmium |
| Aluminum 2024-T4 |
| Steel or iron |
| Cast Iron |
| Chromium-iron (active) |
| Ni-Resist cast iron |
| Type 304 Stainless (active) |
| Type 316 Stainless (active) |
| Lead |
| Tin |
| Nickel (active) |
| Inconel nickel-chromium alloy (active) |
| Brasses |
| Copper |
| Bronzes |
| Copper-nickel alloys |
| Silver solder |
| Nickel (passive) |
| Chromium-iron (passive) |

TABLE 1-continued

| Galvanic Series Of Metals and Alloys |
| --- |
| Type 304 Stainless (passive) |
| Type 316 Stainless (passive) |
| Silver |
| Titanium |
| Graphite |
| Gold |
| Platinum |
| −Low Potential |

It should be understood that the invention is not limited to aircraft manufacture and is not limited to the prevention of corrosion between aluminum and graphite. However, it is particularly well suited thereto. The foregoing description of this invention is intended to enable those skilled in the art to practice the invention. Various other embodiments and modifications as are suited to the particular use contemplated will become apparent upon examination and practice of the invention.

What is claimed is:

1. A corrosion-resistant, electrically-conductive shim for interposition between a material having a first galvanic potential and a material having a second galvanic potential, the shim comprising:
   a first side made of a material having a third galvanic potential that is compatible with the first galvanic potential;
   a second side, made of a material having a fourth galvanic potential that is compatible with the second galvanic potential, the second side juxtaposed in peripheral correspondence with the first side and in contact with the first side in a central contact area therebetween; and
   non-conductive sealant, disposed about the periphery of the two sides, for excluding moisture from the contact area between the first side and the second side.

2. A corrosion-resistant, electrically-conductive shim according to claim 1 characterized in that:
   the material having a first galvanic potential is aluminum;
   the material having a second galvanic potential is graphite epoxy;
   the material of the first side is aluminum;
   the material of the second side is titanium.

3. A corrosion-resistant, electrically-conductive shim according to claim 1 characterized in that:
   the first side is a foil; and
   the second side is a foil.

4. A corrosion-resistant, electrically-conductive shim according to claim 3 characterized in that:
   the non-conductive sealant is a thin layer.

5. A corrosion-resistant, electrically-conductive shim according to claim 1 comprising:
   a hole disposed through the sides in the contact area; and
   non-conductive sealant, disposed around the edge of the hole, for excluding moisture from the contact area between the first side and the second side.

* * * * *